US012695139B2

(12) United States Patent (10) Patent No.: US 12,695,139 B2

Hwang et al. (45) Date of Patent: Jul. 28, 2026

(54) POUCH-SHAPED BATTERY CELL HAVING VENTING PORTION ATTACHED THERETO AND METHOD OF MANUFACTURING THE SAME

(71) Applicant: LG Energy Solution, Ltd., Seoul (KR)

(72) Inventors: Soo Ji Hwang, Daejeon (KR); Yong Su Choi, Daejeon (KR); Sang Hun Kim, Daejeon (KR); Hyung Kyun Yu, Daejeon (KR); Na Yoon Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 691 days.

(21) Appl. No.: 17/769,104

(22) PCT Filed: Nov. 18, 2020

(86) PCT No.: PCT/KR2020/016230

§ 371 (c)(1),
(2) Date: Apr. 14, 2022

(87) PCT Pub. No.: WO2021/118091

PCT Pub. Date: Jun. 17, 2021

(65) Prior Publication Data

US 2023/0231234 A1 Jul. 20, 2023

(30) Foreign Application Priority Data

Dec. 13, 2019 (KR) ......................... 10-2019-0166594

(51) Int. Cl.
*H01M 50/105* (2021.01)
*H01M 50/129* (2021.01)
*H01M 50/317* (2021.01)

(52) U.S. Cl.
CPC ....... *H01M 50/105* (2021.01); *H01M 50/129* (2021.01); *H01M 50/317* (2021.01)

(58) Field of Classification Search
CPC . H01M 50/105; H01M 50/317; H01M 50/128
See application file for complete search history.

(56) References Cited

U.S. PATENT DOCUMENTS

| | | | |
|---|---|---|---|
| 4,237,526 A | 12/1980 | Wood | |
| 2010/0294132 A1 | 11/2010 | Ishida et al. | |

(Continued)

FOREIGN PATENT DOCUMENTS

| | | |
|---|---|---|
| CN | 107302077 A | 10/2017 |
| CN | 207852866 U | 9/2018 |

(Continued)

OTHER PUBLICATIONS

Machine translation JP2011108433A (Year: 2024).*

(Continued)

*Primary Examiner* — Brian R Ohara
*Assistant Examiner* — M. T. Leonard
(74) *Attorney, Agent, or Firm* — Lerner David LLP

(57) ABSTRACT

Disclosed are a pouch-shaped battery cell including a pouch-shaped battery case made of a laminate sheet, an electrode assembly received in the pouch-shaped battery case, and a venting portion configured to discharge gas in the pouch-shaped battery case, wherein the pouch-shaped battery case is provided with an opening, and the opening is opened or closed by the venting portion attached to the inside of the opening, and wherein the venting portion is opened to rapidly discharge gas when pressure in the pouch-shaped battery cell increases and reversibly blocks the inside and the outside of the battery cell, and a method of manufacturing the same.

5 Claims, 4 Drawing Sheets

<u>100</u>

(56) References Cited

U.S. PATENT DOCUMENTS

| | | |
|---|---|---|
| 2012/0015218 A1 | 1/2012 | Lee |
| 2013/0196199 A1 | 8/2013 | Lee |
| 2014/0283691 A1 | 9/2014 | Furuuchi |
| 2016/0036024 A1 | 2/2016 | Choi et al. |
| 2020/0028128 A1 | 1/2020 | Hwang et al. |
| 2020/0086282 A1 | 3/2020 | Tezuka et al. |
| 2020/0086283 A1 | 3/2020 | Tezuka et al. |
| 2020/0172695 A1 | 6/2020 | Park et al. |
| 2021/0134534 A1 | 5/2021 | Toshinari |

FOREIGN PATENT DOCUMENTS

| | | |
|---|---|---|
| CN | 110537265 A | 12/2019 |
| EP | 2410592 A1 | 1/2012 |
| EP | 2783844 A1 | 10/2014 |
| JP | H05-320255 A | 12/1993 |
| JP | H07-289865 A | 11/1995 |
| JP | H10106516 A | 4/1998 |
| JP | 3889029 B1 | 3/2007 |
| JP | 2007214451 A | 8/2007 |
| JP | 2009131833 A | 6/2009 |
| JP | 2011108433 A | 6/2011 |
| JP | 2016031934 A | 3/2016 |
| JP | 2019-192749 A | 10/2019 |
| JP | 2020-528483 A | 9/2020 |
| KR | 20120009592 A | 2/2012 |
| KR | 20130086964 A | 8/2013 |
| KR | 20150034498 A | 4/2015 |
| KR | 20180038880 A | 4/2018 |
| KR | 20190042215 A | 4/2019 |
| WO | 2018-117056 A1 | 6/2018 |

OTHER PUBLICATIONS

Machine translation JP2007214451A (Year: 2024).*
Machine translation KR20150034498A (Year: 2024).*
International Search Report for PCT/KR2020/016230 dated Feb. 25, 2021. 3 pgs.
Extended European Search Report for Application No. 20899163.8 dated Jul. 27, 2022. 9 pgs.
Search Report dated Jan. 2, 2024 from Office Action for Chinese Application No. 202080054322.8 issued Jan. 27, 2024. 2 pgs.

* cited by examiner

【FIG. 1】
<u>100</u>
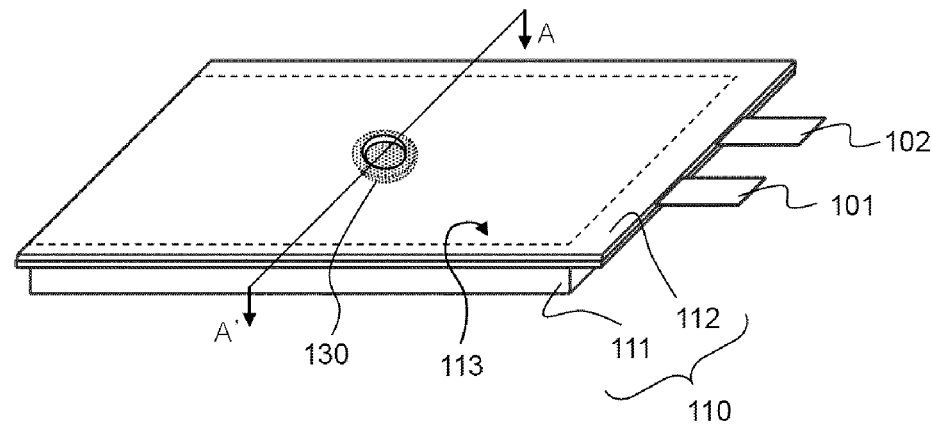
【FIG. 2】
<u>200</u>
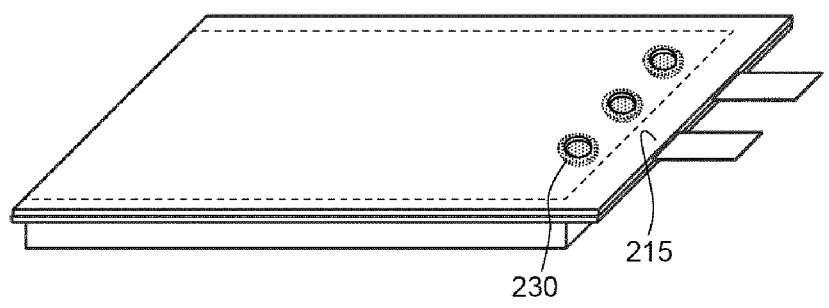

【FIG. 3】
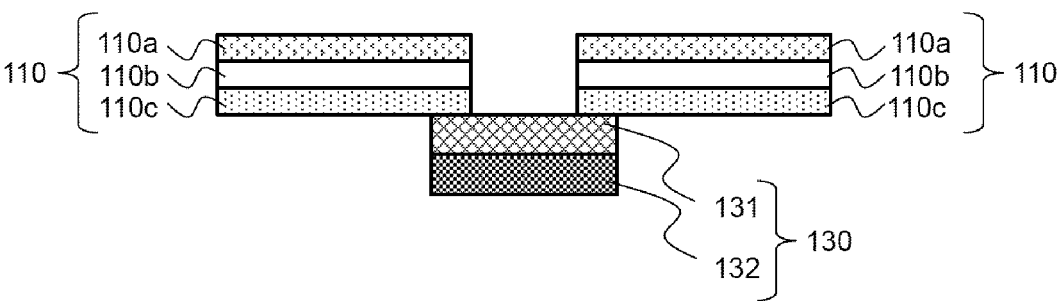
【FIG. 4】
131
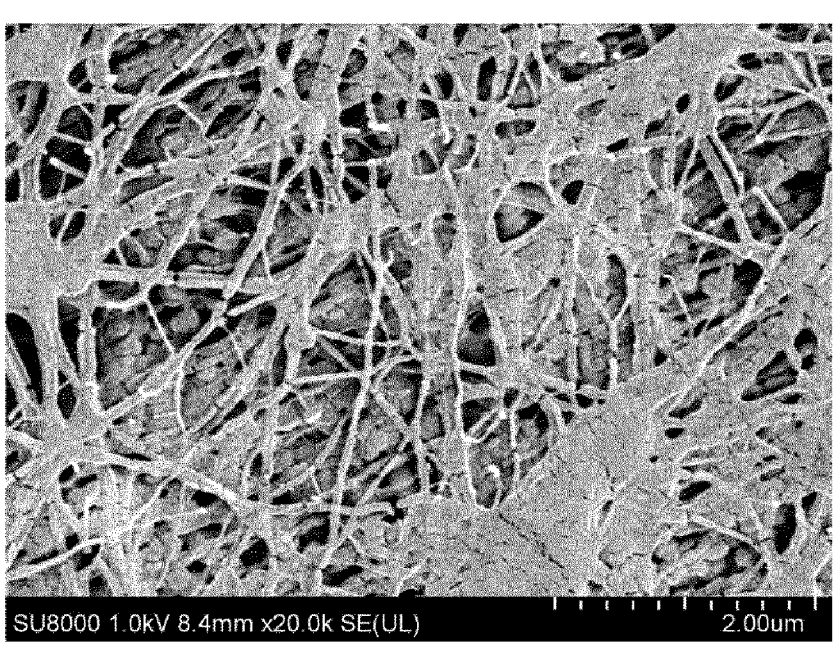

【FIG. 5】
<u>132</u>
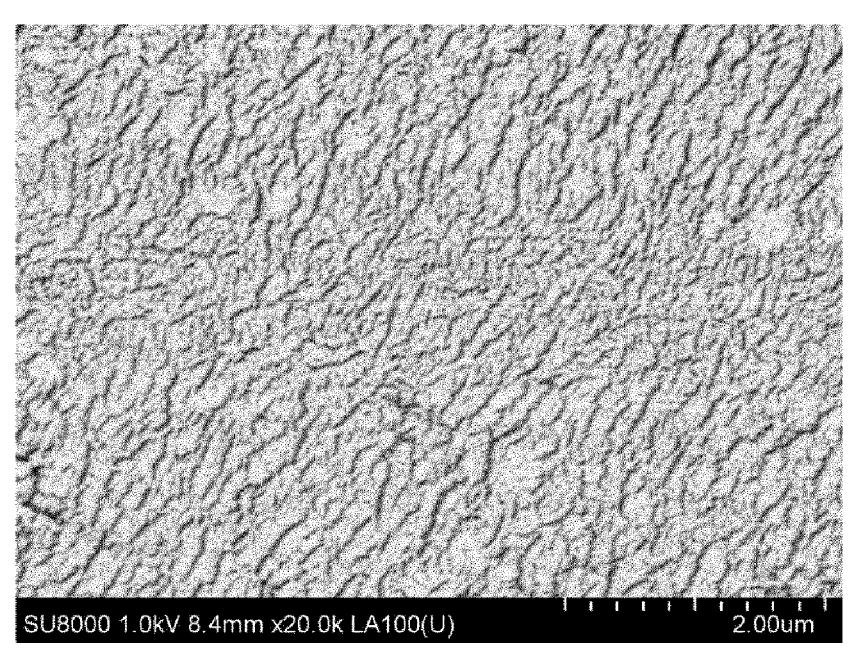
【FIG. 6】
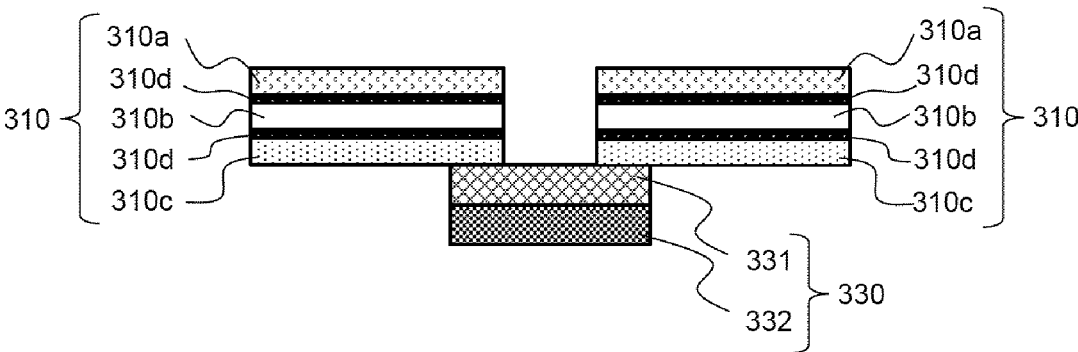

【FIG. 7】
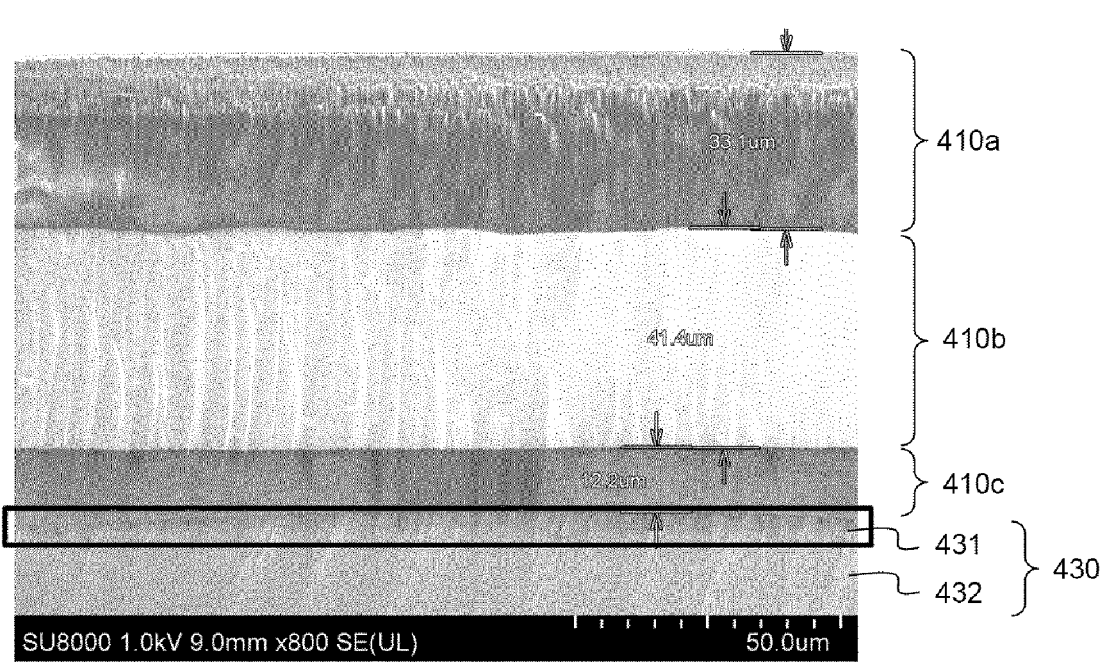

POUCH-SHAPED BATTERY CELL HAVING VENTING PORTION ATTACHED THERETO AND METHOD OF MANUFACTURING THE SAME

CROSS-REFERENCE TO RELATED APPLICATIONS

This application is a national phase entry under 35 U.S.C. § 371 of International Application No. PCT/KR2020/016230, filed on Nov. 18, 2020, published in Korean, which claims priority to Korean Patent Application No. 10-2019-0166594, filed on Dec. 13, 2019, the entire contents of which are hereby incorporated by reference herein-its entirety.

TECHNICAL FIELD

The present invention relates to a pouch-shaped battery cell having a venting portion attached thereto and a method of manufacturing the same, and more particularly to a pouch-shaped battery cell having a venting portion capable of being opened and closed attached to the outer surface of a pouch-shaped battery case such that gas is smoothly discharged when pressure in the pouch-shaped battery cell increases and a method of manufacturing the same.

BACKGROUND ART

A lithium secondary battery, which is reusable and which has high energy density, has attracted attention as a new energy source having environmentally friendly characteristics, since the lithium secondary battery is capable of remarkably reducing the use of fossil fuels and does not generate by-products as the result of use of energy.

Based on the kind and shape of a sheathing member, the lithium secondary battery may be classified as a pouch-shaped battery cell made of a laminate sheet, a cylindrical battery cell made of a metal can, or a prismatic battery cell made of a metal can. Based on the shape thereof, an electrode assembly is classified as a jelly-roll type electrode assembly, a stacked type electrode assembly, a stacked and folded type electrode assembly, or a laminated and stacked type electrode assembly.

The pouch-shaped lithium secondary battery has been used as power for electric vehicles or hybrid electric vehicles that need high-output and high-capacity energy sources, since the pouch-shaped lithium secondary battery can be easily manufactured so as to have various sizes, is light, and has high energy density.

The pouch-shaped lithium secondary battery is manufactured by receiving an electrode assembly and an electrolytic solution in a pouch-shaped battery case made of a laminate sheet and hermetically sealing the outer periphery of the battery case using heat and pressure.

In a process of manufacturing the lithium secondary battery, gas is generated due to decomposition of the electrolytic solution at the time of activation. In addition, gas is generated in the battery cell even in a process of charging and discharging the battery cell and in an abnormal use environment. As a result, pressure in the battery cell increases.

Such an increase in pressure may cause explosion of the battery cell. For this reason, research on discharging gas to the outside before explosion of the battery in order to secure safety of the battery has been conducted.

In connection therewith, Patent Document 1 relates to a battery module having a valve member including a porous film made of a Teflon-based resin added thereto, wherein the valve member is made of porous film, such as PTFE, and the porous film is fixed by a support member at the lower side of a vent hole formed in a housing cover.

That is, Patent Document 1 discloses a valve member applied to a battery module housing but does not disclose a venting member applicable to a pouch-shaped battery cell.

Patent Document 2 relates to a secondary battery having a structure configured to discharge gas in a battery case through a communication path defined in a protrusion integrally formed with the battery case, wherein the protrusion and the communication path protrude from one side of the outer periphery of the battery case.

Therefore, there is a high necessity for a pouch-shaped battery cell having a structure in which gas is smoothly discharged when pressure in the pouch-shaped battery cell increases and the battery is continuously usable after discharge of gas while the external size of a battery case is not increased and a method of manufacturing the same.

PRIOR ART DOCUMENTS (Patent Document 1) Korean Patent Application Publication No. 2012-0009592 (2012 Feb. 2)
(Patent Document 2) Korean Patent Application Publication No. 2018-0038880 (2018 Apr. 17)

DISCLOSURE

Technical Problem

The present invention has been made in view of the above problems, and it is an object of the present invention to provide a pouch-shaped battery cell having a venting portion attached to the inside of an opening formed in a pouch-shaped battery case, the venting portion being capable of being opened and closed, and a method of manufacturing the same.

Technical Solution

In order to accomplish the above object, a pouch-shaped battery cell having a venting portion attached thereto according to the present invention includes a pouch-shaped battery case made of a laminate sheet, an electrode assembly received in the pouch-shaped battery case, and a venting portion configured to discharge gas in the pouch-shaped battery case, wherein the pouch-shaped battery case is provided with an opening, and the opening is opened or closed by the venting portion attached to the inside of the opening.

The venting portion may be configured to have a structure in which a first layer having pores formed therein and a second layer having no pores formed therein are stacked.

The first layer and the second layer may be made of an identical material.

The material may be polytetrafluoroethylene (PTFE).

The pouch-shaped battery case may include an outer resin layer, a metal layer, and an inner resin layer, and the venting portion may be attached such that the first layer and the inner resin layer come into contact with each other.

The inner resin layer may be hardened in the state in which a portion of the inner resin layer melts and moves into the pores of the first layer, whereby the inner resin layer and the first layer may be coupled to each other.

The venting portion may be attached to a portion of the pouch-shaped battery case adjacent to a sealed portion.

The pouch-shaped battery case may include a first battery case having an electrode assembly receiving portion formed therein and a second battery case coupled to the first battery case, the second battery case being configured to hermetically seal the pouch-shaped battery case together with the first battery case, and the venting portion may be attached to at least one of a central portion of the first battery case and a central portion of the second battery case.

Meanwhile, the present invention provides a method of manufacturing the pouch-shaped battery cell. Specifically, the method of manufacturing the pouch-shaped battery cell includes (a) preparing a laminate sheet having an opening formed therein, (b) attaching a venting portion to the opening, (c) shaping the laminate sheet to manufacture a pouch-shaped battery case, and (d) receiving an electrode assembly in the pouch-shaped battery case and hermetically sealing the pouch-shaped battery case.

The venting portion may be configured to have a structure in which a first layer having pores formed therein and a second layer having no pores formed therein are stacked.

The first layer and the second layer may be made of an identical material.

The material may be polytetrafluoroethylene (PTFE).

In addition, the present invention provides a battery pack including the pouch-shaped battery cell.

DESCRIPTION OF DRAWINGS

FIG. 1 is a perspective view of a pouch-shaped battery cell having a venting portion according to a first embodiment formed therein.

FIG. 2 is a perspective view of a pouch-shaped battery cell having a venting portion according to a second embodiment formed therein.

FIG. 3 is a partial enlarged view of a vertical section taken along A-A' of FIG. 1.

FIG. 4 is an SEM photograph of a first layer of the venting portion.

FIG. 5 is an SEM photograph of a second layer of the venting portion.

FIG. 6 is another embodiment of FIG. 3.

FIG. 7 is an SEM photograph of an overlap coupling portion between a pouch-shaped battery case and a venting portion.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

A description to embody elements through limitation or addition may be applied to all inventions, unless particularly restricted, and does not limit a specific invention.

Hereinafter, embodiments of the present invention will be described in detail with reference to the accompanying drawings.

FIG. 1 is a perspective view of a pouch-shaped battery cell having a venting portion according to a first embodiment formed therein.

Referring to FIG. 1, the pouch-shaped battery cell 100 is configured to have a structure in which an electrode assembly is received in a pouch-shaped battery case made of a laminate sheet together with an electrolytic solution and the outer periphery of the pouch-shaped battery case is sealed.

The electrode assembly may be a unidirectional electrode assembly, in which a positive electrode lead 101 and a negative electrode lead 102 protrude in one direction. Alternatively, the electrode assembly may be a bidirectional electrode assembly, in which a positive electrode lead and a negative electrode lead protrude in different directions, unlike what is shown in FIG. 1.

The pouch-shaped battery case 110 includes a first battery case 111 having an electrode assembly receiving portion 113 formed therein and a second battery case 112 coupled to the first battery case 111 in order to hermetically seal the pouch-shaped battery case 110. An opening is formed in a central portion of the second battery case 112, and a venting portion 130 is attached to the inside of the opening.

The venting portion 130 has a circular planar shape. Since the size of the venting portion is greater than the diameter of the opening formed in the pouch-shaped battery case 110, the venting portion blocks the opening of the pouch-shaped battery case at the inside of the pouch-shaped battery case.

Although not shown in FIG. 1, a venting portion may be further formed at a central portion of the first battery case 111 in addition to the central portion of the second battery case 112. Alternatively, the venting portion may be formed only at the central portion of the first battery case.

In the case in which the pouch-shaped battery case 110 swells due to gas generated in the pouch-shaped battery cell 100 as the result of side reaction thereof, the central portions of the first battery case and the second battery case the most greatly swell, whereby pressure may be concentrated on the central portions of the first battery case and the second battery case. In this case, the difference between the pressure of gas at the venting portion and pressure outside the pouch-shaped battery cell increases, and therefore the gas may be discharged through pores of the venting portion.

That is, in the case in which there is no or little difference between pressure in the pouch-shaped battery cell and pressure outside the pouch-shaped battery cell, no gas is discharged through the venting portion according to the present invention, and the venting portion prevents foreign matter from being introduced into the battery cell. In the case in which the difference in pressure between the inside and the outside of the pouch-shaped battery cell is 0.1 atm or more, however, the gas in the pouch-shaped battery cell is discharged through a first layer and a second layer of the venting portion due to the difference in pressure. In the case in which the difference in pressure between the inside and the outside of the pouch-shaped battery cell is 0.1 atm or less or there is no difference in pressure therebetween as the result of discharge of gas to some extent, a process of blocking discharge of gas may be reversibly performed.

FIG. 2 is a perspective view of a pouch-shaped battery cell having a venting portion according to a second embodiment formed therein.

Referring to FIG. 2, the pouch-shaped battery cell 200 is identical in construction to the pouch-shaped battery cell of FIG. 1 except that the position of the venting portion 230 is different from the position of the venting portion 130 formed in the pouch-shaped battery cell of FIG. 1.

The venting portion 230 of FIG. 2 is configured to have a structure in which three venting portions 230 are attached to the portion of the pouch-shaped battery case adjacent to a sealed portion 215 in the state of being spaced apart from each other.

The radius of the venting portion 230 shown in FIG. 2 is less than the radius of the venting portion 130 shown in FIG. 1. The number, size, and position of the venting portions are selectively applicable in consideration of the positions at which the venting portions are attached, the size of a battery case, and the amount of gas that is generated.

FIG. 3 is a partial enlarged view of a vertical section taken along A-A' of FIG. 1, showing the structure of the pouch-shaped battery case having the venting portion according to the present invention attached thereto in detail.

Referring to FIG. 3, the pouch-shaped battery case 110 includes an outer resin layer 110a, a metal layer 110b, and an inner resin layer 110c.

The outer resin layer 110a serves to protect the battery cell from the outside. Consequently, it is required for the outer resin layer to exhibit excellent tolerance to the external environment, and therefore excellent tensile strength and weather resistance of the outer resin layer for the thickness thereof are necessary. For example, a polyester-based resin, such as polyethylene terephthalate (PET), polybutylene terephthalate (PBT), or polyethylene naphthalate (PEN), a polyolefin-based resin, such as polyethylene (PE) or polypropylene (PP), a polystyrene-based resin, such as polystyrene, a polyvinyl chloride-based resin, or a polyvinylidene chloride-based resin may be used. These materials may be used either alone or as a mixture of two or more materials, and an oriented nylon (ONy) film may be further used.

The metal layer may be made of aluminum (Al) or an aluminum alloy in order to exhibit a function of improving strength of the battery case in addition to a function of preventing introduction of foreign matter, such as gas and moisture, or leakage of an electrolytic solution. Examples of the aluminum alloy may include alloy numbers 8079, 1N30, 8021, 3003, 3004, 3005, 3104, and 3105. These materials may be used either alone or as a mixture of two or more materials.

A polymer resin that exhibits thermal fusibility (thermal bondability), has low hygroscopicity to the electrolytic solution in order to inhibit permeation of the electrolytic solution, and is not expanded or eroded by the electrolytic solution may be used as the inner resin layer. Preferably, polypropylene, acid-modified polypropylene, or a combination thereof is used.

In one preferred example, the pouch-shaped battery case according to the present invention may be configured to have a structure in which the thickness of the outer resin layer is 5 μm to 40 μm, the thickness of the metal layer is 20 μm to 150 μm, and the thickness of the inner resin layer is 10 μm to 50 μm. In the case in which the thickness of each layer of the laminate sheet is too small, it is difficult to achieve a material blocking function and strength improvement, which is undesirable. On the other hand, in the case in which the thickness of each layer of the laminate sheet is too large, formability is reduced and an increase in the thickness of the sheet is caused, which is also undesirable.

The venting portion 130 according to the present invention is configured to have a structure in which a first layer 131 having pores formed therein and a second layer 132 having no pores formed therein are stacked. The first layer 131 and the second layer 132 are made of the same material, such as polytetrafluoroethylene (PTFE).

PTFE exhibits excellent electrolytic solution resistance, heat resistance, and hydrophobicity. Consequently, PTFE may be used as the material for the venting portion attached to the inside of the pouch-shaped battery case.

The first layer 131 of the venting portion 130 is different in shape from the second layer 132 of the venting portion in that pores are formed in the first layer while no pores are formed in the second layer.

In connection therewith, FIG. 4 is an SEM photograph of the first layer of the venting portion, and FIG. 5 is an SEM photograph of the second layer of the venting portion.

Referring to FIGS. 4 and 5, it can be seen that the first layer of FIG. 4 has a structure in which open type pores, through which the inside and the outside of the first layer communicate with each other, are formed and that the second layer of FIG. 5 has a structure in which the surface of the second layer is rugged but no pores are formed. Since the second layer is made of PTFE, however, gas may be discharged through microscopic gaps in the polymer.

That is, the inner resin layer of the pouch-shaped battery case may melt into the pores of the first layer of the venting portion, whereby the venting portion may be stably attached to the inner surface of the pouch-shaped battery case. Gas generated in the pouch-shaped battery case may be discharged to the outside through the first layer and the second layer of the venting portion.

Meanwhile, the melting point of PTFE is 327° C., which is greatly different from the melting point, about 160° C., of polypropylene (PP), which is mainly used as the inner resin layer of the pouch-shaped battery case.

In the case in which heat and pressure are applied in order to attach the venting portion made of PTFE to the inner resin layer made of PP, PP may be damaged if heat is applied to the extent to which PTFE melts. In the case in which heat is applied to the extent to which PP melts although PP is not damaged, on the other hand, PTFE does not melt, and therefore it is difficult to couple the venting portion and the inner resin layer to each other.

In the present invention, the structure in which the venting portion is attached to the pouch-shaped battery case such that the first layer 131, in which the pores are formed, comes into contact with the inner resin layer 110c of the pouch-shaped battery case is used. In the case in which high temperature and pressure are applied to an overlap portion between the pouch-shaped battery case and the venting portion in order to attach the venting portion to the pouch-shaped battery case, therefore, the inner resin layer 110c is hardened in the state in which a portion of the inner resin layer melts and moves into the pores of the first layer 131, whereby the first layer 131 and the inner resin layer 110c are coupled to each other in the state in which the inner resin layer is anchored to the first layer 131.

FIG. 6 is another embodiment of FIG. 3, showing the structure of a pouch-shaped battery case having a venting portion according to the present invention attached thereto in detail.

Referring to FIG. 6, the pouch-shaped battery case 310 is configured to have a structure in which an outer resin layer 310a, an adhesive layer 310d, a metal layer 310b, an adhesive layer 310d, and an inner resin layer 310c are sequentially stacked in a downward direction on the figure, and is different from the pouch-shaped battery case shown in FIG. 3 in that the adhesive layer is further provided between the outer resin layer and the metal layer and the adhesive layer is further provided between the metal layer and the inner resin layer. That is, force of adhesion between the layers of the pouch-shaped battery case of FIG. 6 may be greater than force of adhesion between the layers of the pouch-shaped battery case of FIG. 3 by the provision of the adhesive layers.

The venting portion 330 includes a first layer 331 having pores formed therein and a second layer 332 having no pores formed therein, and the first layer 331 is attached to the inner resin layer 310c.

In the case in which heat and pressure are applied to an overlap portion between the venting portion and the pouch-shaped battery case 310 in order to attach the venting portion to the pouch-shaped battery case, therefore, the inner resin layer 310c melts and moves to the pores of the first layer 331, whereby the inner resin layer and the first layer are coupled to each other by anchoring.

Meanwhile, even in the case in which the venting portion is attached to the outside of the opening of the pouch-shaped battery case, it is possible to achieve a gas discharge effect when pressure in the pouch-shaped battery case due to gas increases. In this case, however, the metal layer of the pouch-shaped battery case is exposed from the portion of the pouch-shaped battery case in which the opening is formed. As a result, hydrofluoric acid generated by side reaction of the electrolytic solution corrodes the metal layer made of aluminum, which is undesirable.

FIG. 7 is an SEM photograph of an overlap coupling portion between a pouch-shaped battery case and a venting portion.

Referring to FIG. 7, the pouch-shaped battery case includes an outer resin layer 410a, a metal layer 410b, and an inner resin layer 410c. The venting portion 430 has a structure in which a first layer 431 and a second layer 432 are stacked.

The outer resin layer 410a has a structure in which a PET layer, an adhesive layer, a nylon layer, and an adhesive layer are sequentially stacked in an inward direction. The metal layer 410b is a layer made of aluminum. The inner resin layer 410c may be made of a combination of polypropylene and acid-modified polypropylene, or may be made of a cast polypropylene film.

The venting portion 430 includes a first layer 431 made of PTFE while having pores formed therein and a second layer 432 made of PTFE while having no pores formed therein.

Before the pouch-shaped battery case and the venting portion are coupled to each other, the overall thickness of the outer resin layer may be 33.1 μm, the thickness of the metal layer may be 41.4 μm, and the thickness of the inner resin layer may be 80 μm.

The inner resin layer may be manufactured by extruding each of polypropylene and acid-modified polypropylene on the metal layer, the inner resin layer may be laminated with the metal layer and the outer resin layer to manufacture the pouch-shaped battery case. The thickness of polypropylene may be 40 μm, and the thickness of acid-modified polypropylene may be 40 μm.

Alternatively, the inner resin layer may be made of cast polypropylene (CPP) film having a thickness of 80 μm. The cast polypropylene film may be attached to the metal layer using an adhesive, and the cast polypropylene film and the metal layer may be laminated with the outer resin layer to manufacture the pouch-shaped battery case.

When heat and pressure are applied to the pouch-shaped battery case and the venting portion such that the pouch-shaped battery case and the venting portion are coupled to each other, polypropylene of the inner resin layer melts and moves into the pores of the first layer. As a result, as shown in FIG. 7, the thickness of the inner resin layer is reduced to 12.2 μm, and no pores are visible in the first layer 431.

That is, it can be seen that the inner resin layer is introduced into the pores of the first layer, whereby the inner resin layer and the first layer are coupled to each other by anchoring, and therefore overall adhesion between the inner resin layer and the first layer is uniformly achieved. Consequently, the venting portion is stably attached to the inside of the pouch-shaped battery case.

Temperature necessary to attach the first layer and the inner resin layer to each other may be 180° C. to 220° C., pressure necessary to attach the first layer and the inner resin layer to each other may be 0.05 MPa to 0.5 MPa, and application time may be selectively applied within a range of 1 second to 5 seconds.

As a concrete example, in the case in which gas is generated in the pouch-shaped battery cell as the result of side reaction of the electrolytic solution, pressure in the pouch-shaped battery cell becomes greater than external atmospheric pressure, whereby the gas may be discharged through the opening formed in the pouch-shaped battery case and the first layer and the second layer of the venting portion.

In the pouch-shaped battery cell according to the present invention, therefore, a process of discharging gas in the battery cell through the venting portion when pressure in the battery cell increases and blocking discharge of gas and preventing introduction of external moisture when the pressure in the battery cell becomes equal to external atmospheric pressure may be reversibly performed.

Meanwhile, a method of manufacturing a pouch-shaped battery cell according to the present invention may include (a) a step of preparing a laminate sheet having an opening formed therein, (b) a step of attaching a venting portion to the opening, (c) a step of shaping the laminate sheet to manufacture a pouch-shaped battery case, and (d) a step of receiving an electrode assembly in the pouch-shaped battery case and hermetically sealing the pouch-shaped battery case.

That is, it is preferable that the opening be formed before an electrode assembly receiving portion is formed and that the electrode assembly receiving portion be formed in the state in which the venting portion is attached to the opening in consideration of processing convenience.

However, step (b) may be performed between step (c) and step (d), as needed. Alternatively, a step of forming an opening in a laminate sheet and attaching a venting portion to the opening may be performed between step (c) and step (d).

The venting portion may be configured to have a structure in which a first layer having pores formed therein and a second layer having no pores formed therein are stacked, and each of the first layer and the second layer may be made of PTFE.

Those skilled in the art to which the present invention pertains will appreciate that various applications and modifications are possible within the category of the present invention based on the above description.

DESCRIPTION OF REFERENCE SYMBOLS

100, 200: Pouch-shaped battery cells
101: Positive electrode lead

102: Negative electrode lead
110, 310: Pouch-shaped battery cases
110*a*, 310*a*, 410*a*: Outer resin layers
110*b*, 310*b*, 410*b*: Metal layers
110*c*, 310*c*, 410*c*: Inner resin layers
111: First battery case
112: Second battery case
113: Electrode assembly receiving portion
130, 230, 330, 430: Venting portions
131, 331, 431: First layers
132, 332, 432: Second layers
215: Sealed portion
310*d*: Adhesive layer

INDUSTRIAL APPLICABILITY

As is apparent from the above description, a pouch-shaped battery cell according to the present invention is configured to have a structure in which a venting portion is attached to the inside of a battery case, and therefore it is possible to minimize an increase in size of the battery cell due to addition of the venting portion.

In addition, gas is immediately discharged when pressure in the battery cell increases, and therefore it is possible to maintain the pressure in the battery cell at a predetermined level.

In addition, the venting portion according to the present invention is not ruptured while being opened but is capable of being opened and closed so as to be reversibly used, and therefore it is possible to continuously use the battery cell after discharge of gas.

The invention claimed is:

1. A pouch-shaped battery cell comprising:

a pouch-shaped battery case made of a laminate sheet having an opening therein, the pouch-shaped battery case comprising an outer resin layer, a metal layer, and an inner resin layer;

an electrode assembly received in the pouch-shaped battery case; and a venting portion attached to an inside of the opening and configured to discharge gas to an outside of the pouch-shaped battery case when a pressure inside of the pouch-shaped battery case becomes greater than an atmospheric pressure outside of the pouch-shaped battery case, wherein the venting portion has a first layer having pores formed therein and a second layer having no pores formed therein, the first layer being stacked with the second layer, wherein a portion of the first layer of the venting portion and the inner resin layer of the pouch-shaped battery case directly contact each other, wherein a portion of the inner resin layer extends into the pores of the first layer, thereby coupling the inner resin layer and the first layer to each other, such that no pores remain in the portion of the first layer that directly contacts the inner resin layer, wherein the first layer and the second layer are each consisting of polytetrafluoroethylene (PTFE), and wherein the pouch-type battery case has a first thickness where the venting portion is attached and a second thickness where the venting portion is not attached, and the first thickness is thinner than the second thickness.

2. The pouch-shaped battery cell according to claim 1, wherein the venting portion is attached to a portion of the pouch-shaped battery case adjacent to a sealed portion of the pouch-shaped battery case.

3. The pouch-shaped battery cell according to claim 1, wherein the pouch-shaped battery case comprises a first case portion having an electrode assembly receiving portion formed therein and a second case portion coupled to the first case portion, the second case portion being configured to hermetically seal the pouch-shaped battery case together with the first case portion, and the venting portion is attached to at least one of a central portion of the first case portion and a central portion of the second case portion.

4. A method of manufacturing a pouch-shaped battery cell, the method comprising:

(a) preparing a laminate sheet having an opening formed therein;

(b) attaching a venting portion to the opening, the venting portion having a first layer having pores formed therein and a second layer having no pores formed therein, the first layer being stacked with the second layer;

(c) shaping the laminate sheet to manufacture a pouch-shaped battery case; and (d) placing an electrode assembly in the pouch-shaped battery case and hermetically sealing the pouch-shaped battery case, wherein a portion of the first layer of the venting portion and an inner resin layer of the pouch-shaped battery case directly contact each other, wherein a portion of the inner resin layer extends into the pores of the first layer, thereby coupling the inner resin layer and the first layer to each other, such that no pores remain in the portion of the first layer that directly contacts the inner resin layer, wherein the first layer and the second layer are each consisting of polytetrafluoroethylene (PTFE), and wherein the pouch-type battery case has a first thickness where the venting portion is attached and a second thickness where the venting portion is not attached, and the first thickness is thinner than the second thickness.

5. A battery pack comprising the pouch-shaped battery cell according to claim 1.

* * * * *